Dec. 22, 1964    A. WEBER ETAL    3,162,777
PROGRAM-TIMING DEVICE
Filed Jan. 26, 1961
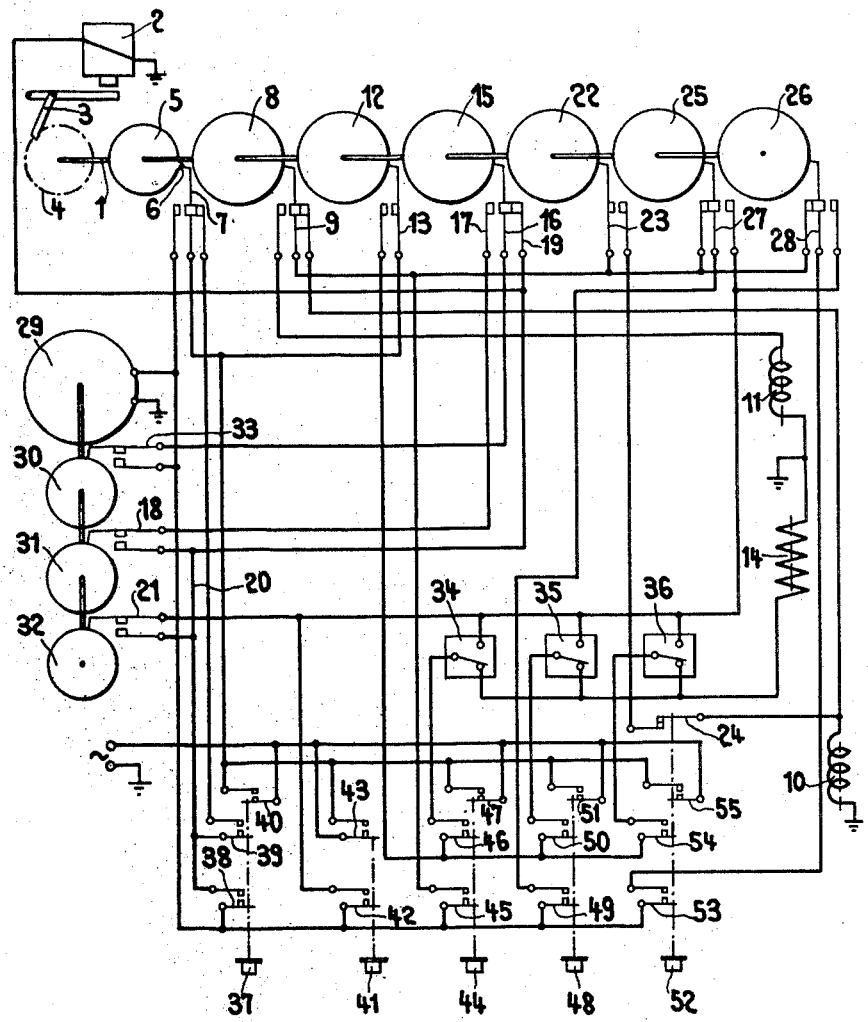
INVENTORS
Artur Weber and André Rufer
BY
ATTORNEYS United States Patent Office 3,162,777
Patented Dec. 22, 1964

3,162,777
PROGRAM-TIMING DEVICE
Artur Weber, Muri, Bern, and André Rufer, Murten, Switzerland, assignors to Saia A.G., Murten, Switzerland
Filed Jan. 26, 1961, Ser. No. 85,127
8 Claims. (Cl. 307—141.4)

This invention relates to a program-timing device, for instance for controlling the operation of an automatic washing machine, comprising cam shaft actuating switches controlling a standard program of the machine, and wherein it is possible to shorten or to omit parts of the said standard program by driving the cam shaft at a speed substantially exceeding the normal speed in an endeavour to control different types of programs.

Although relatively simple means are required for effecting the above kind of program selection, the possibilities for modifying the said standard program are limited because it is only possible to shorten parts thereof. When the cam shaft is advanced step by step as is usually preferred, the standard program should comprise a great number of steps in order that a great number of different programs may be derived from this standard program by omitting effective steps. Due to the high number of steps the cam discs have to be of relatively large diameter.

It is a first object of this invention to reduce the number of steps of the cam shaft but at the same time to improve the possibilities of varying the program, this being obtained by selectively shortening or extending parts of the program by means selectively operable for reducing the normal speed of the cam shaft or for increasing the speed of the cam shaft.

Further objects and advantages of the invention will be apparent from the following specification and from the attached drawing showing, by way of example, one embodiment of the invention.

The program-timing device schematically illustrated in the drawing has a cam shaft 1 adapted for stepwise advance by means of a stepping solenoid 2, a stepping pawl 3 and a stepping wheel 4. Parts 2 to 4 schematically shown in the drawing are well known in the art and need no further explanation. A number of cam discs are mounted on cam shaft 1. Cam disc 5 having a cam 6 controls a change-over switch 7 at the start and end of each operating cycle in a manner explained later on. A second cam disc 8 operates a change-over switch 9 whereof the one outer contact is connected to a relay 10 controlling the washing operation of the washing machine, whereas the other outer contact is connected to a relay 11, the washing drum being driven at a high speed for swinging the water from the goods contained in the drum when relay 11 is energized. Another cam disc 12 operates a switch 13 controlling the heater 14 of the washing machine. Another cam disc 15 operates a change-over switch 16 having an outer contact 17 connected to a pulse switch 18 and another outer contact 19 connected to the stepping solenoid 2 and to a common conductor 20 of pulse switches 18 and 21. Another cam disc 22 of the cam shaft 1 operates a switch 23 connected to the relay 10 through a switch 24 of a key switch described below. The cam shaft 1 has two further cam discs 25 and 26 designated program discs in the following specification due to their particular function. Change-over switches 27 and 28 are operated by program discs 25 and 26 respectively.

The program-timing device has a synchronous motor or another suitable driving member 29 adapted for continuous rotation of cam discs 30, 31 and 32 through gear means not shown in the drawing, the cam discs 30, 31 and 32 being so shaped and the said gear means being so designed that the pulse switch 33 associated with cam disc 30 is periodically closed each minute, switch 18 associated with cam disc 31 is periodically closed at intervals of three minutes and switch 21 associated with cam disc 32 is closed twice per second.

The timing device has three thermostats 34, 35 and 36. Their switches are in the position shown in the drawing when the thermostats are in cold state, and the switch of each thermostat being changed over to the other contact when the temperature in the washing machine reaches a temperature to which the thermostat is adjusted.

The said key switch comprises a start key 37 operating switches 38 to 40, a high-speed key 41 operating switches 42 and 43, a key 44 for preselection of the standard program and operating switches 45 to 47, a key 48 for preselection of a first modified program and actuating switches 49, 50 and 51, and a key 52 for preselection of a second modified program and operating switches 53 to 55 and a switch 24. The interconnection of the elements described above is clear from the drawing and will be understood without further explanation.

The program-timing device is shown in its rest position. The cam shaft 1 is in its zero or initial position wherein switch 7 is maintained in the position shown in the drawing by cam 6 of the cam disc 5, and wherein all the keys of the key switch are released to inoperative position. The thermostats 34 to 36 are in their rest position and the synchronous motor 29 is deenergized and inoperative. For starting up the timing device for control of the standard program the key 44 associated to the standard program is depressed whereby switches 45 to 47 are closed without first initiating any further operation. However, when the start key 37 is now depressed for a short time the stepping solenoid 2 is energized through switch 40, switch 7 and switch 39. At the same time the synchronous motor 29 is energized through switch 38. By the said first start pulse applied to the stepping solenoid 2 the cam shaft 1 is advanced by one step whereby the switch 7 is changed over and the synchronous motor 29 is further energized after release of the start key 37 through switch 47 of the selector key 44 and switch 7 changed over to its left position. As stated above, the pulse switches 33, 18 and 21 are periodically closed at the frequencies indicated above by the cam discs 30 to 32 driven by the continuously rotating synchronous motor 29. As long as switch 16 is maintained in its right-hand position shown in the drawing the pulse periodically produced by switch 33 at intervals of one minute are directly transmitted to the stepping solenoid 2 through switch 16 and its contact 19 so that the cam shaft 1 is periodically advanced at normal speed at intervals of one minute. It is admitted that the cam shaft is advanced at this normal speed for control of a first preliminary washing operation. It is further assumed that during this preliminary washing operation the heater 14 is energized by reversal of switch 13, whereby a heater current is set up through switch 13, switch 46 actuated by key 44 and the thermostat 34 associated with the standard program, but it is assumed that the temperature does not rise to a temperature sufficient for reversing thermostat 34. It is further assumed that at the end of the preliminary washing operation and at the start of the main washing operation respectively, switch 16 is changed over by cam disc 15 to the left contact 17. The one-minute pulses produced by switch 33 will no longer be transmitted directly to the stepping solenoid 2 but are transmitted from contact 17 to switch 18 which is closed at intervals of three minutes. Therefore, pulses will now be transmitted to the stepping solenoid 2 at intervals of three minutes whenever switches 33 and 18 are simultaneously closed, the cam shaft 1 being thereby advanced at a reduced speed of one step in three minutes whereby the elapse of the program is extended. It is assumed that the heater 14 is again energized through the circuit referred to above. Further switches not shown in the drawing may alternatively and periodically be reversed by suitable cam discs not shown and driven by the synchronous motor 29, for instance at intervals of thirty seconds, for periodically reversing the rotating direction of the washing drum when relay 10 is energized either through switch 9 or through switches 23 and 24. Reversing switches of this type are shown in our U.S. Patent No. 2,913,913 at 28–31. In this way the program runs on until the washing temperature suitable for the standard program is reached and the switch of thermostat 34 is changed over. The heater 14 is thereby deenergized and the pulse switch 21 is energized whereby a number of high sequence pulses is transmitted to the stepping solenoid 2. The cam shaft 1 is thus driven at substantially increased speed until the circuit is opened by reversal of switch 13. Cam discs 12 and 15 are so adjusted that when switch 13 is opened in the manner just set out for ending the high-speed advance of the cam shaft 1, switch 16 has also been reversed back to the position indicated in the drawing so that the cam shaft 1 is now further advanced at normal speed, that is, at intervals of one minute. Due to this arrangement, once the prescribed washing temperature to which the thermostat 34 is adjusted is reached, the cam shaft is rapidly advanced to a position predetermined by cam disc 12 whereupon the washing operation is continued at the prescribed temperature for a time accurately determined by the advance of the cam shaft 1 at normal speed and by the shape of cam discs 12 and 15. It is thus possible, independently of the time required for heating up the washing liquid to the desired temperature, to obtain a washing operation of predetermined duration at the prescribed temperature because the heating period is controlled while the cam shaft is advanced at low speed, and due to the rapid advance of the cam shaft to a first predetermined position when the desired washing temperature is reached and due to the advance of the cam shaft at normal speed from the said first position to a second predetermined position of the cam shaft, this advance at normal speed taking a predetermined time equal to the time during which washing at the desired washing temperature takes place. A similar distribution of extended or shortened program portions is possible during other parts of the washing cycle whereby the speed of the cam shaft 1 may be controlled by cam discs, thermostats or other elements responsive to conditions of the machine to be controlled. At the end of the program, that is, when the cam shaft 1 has executed one full rotation, switch 7 is changed over into the position shown in the drawing and the synchronous motor 29 is deenergized. Means well known in the art may be provided for automatically releasing the depressed key to inoperative position for automatically deenergizing all electrical circuits. In any case the cam shaft 1 is stopped in its end or zero position and the cam discs are so designed that for this position all the machine elements controlled by the timer are in off-position.

When it is now desired to control the first modified program, selector key 48 is first depressed whereby any other selector key is released and returned to inoperative condition in a manner well known for key switches. The start key is thereafter depressed whereby the same operation occurs as set out above for the start of the standard program, the cam shaft 1 starting its stepwise rotation. When switch 27 is maintained in its left-hand position shown in the drawing all the other circuits are energized and the standard program is controlled in the manner set out above. When switch 27 is changed over to its right-hand position by cam disc 25, the other electric control circuits are deenergized and pulse contact 21 is energized so that the cam shaft 1 is advanced at high speed until switch 27 is returned to its normal position indicated in the drawing. Therefore, the program disc 25 and its associated program switch 27 will only cause shortening of parts of the standard program described above in a manner predetermined by the shape of program disc 25. Therefore, substantially the same operation is possible in this modified program as described for the standard program. As an example, the period during which a washing operation occurs at the temperature predetermined by the thermostat 35 which is operative in the control circuit comprising switch 50 of the selector key 48, may be shortened in a predetermined measure by reversal of switch 27.

As set out above, the control circuits are deenergized when switch 27 is changed over to its right-hand high-speed position. It may be desirable to similarly deenergize the control circuits during the high-speed periods of the standard program. A relay may be provided to this end, this relay being energized for deenergizing the control circuits whenever the high-speed pulse switch 21 is energized.

When it is desired to control the second modified program, key 52 is first actuated whereafter the timer is started in the manner explained above by operation of start key 37. The same operation will take place as described above for the first modified program with the only difference that the additional high-speed periods of the cam shaft 1 are controlled through switch 53 by program switch 28 and program disc 26 respectively. The washing temperature is controlled through switch 54 by thermostat 36. When key 52 is actuated, switch 24 is opened so that relay 10 is only actuated by switch 9. Preferably the cam disc 8 actuating switch 9 may be shaped in a manner that switch 9 is alternatively maintained in its right-hand position shown in the drawing and in an intermediate open position wherein no contact is made between switch 9 and any of its outer contacts, during one or more periods of the washing cycle. Therefore, when relay 10 is exclusively controlled by switch 9, the washing drum will rotate whenever switch 9 is in its right-hand position shown in the drawing whereas the washing drum will be stopped whenever switch 9 is in its said neutral open position. This second modified program, wherein switch 24 is opened is particularly adapted for regularly but carefully washing delicate articles. For the other programs, wherein switch 24 remains closed, relay 10 is additionally controlled by switch 23 and cam disc 22 respectively, and cam disc 22 may be shaped in a manner to override the alternating closing and opening of switch 9 and to effect continuous energization of relay 10 and a continuous washing operation at least for parts of the washing cycle. Therefore, the standard program and the first modified program are suitable for washing goods not needing particular care.

When it is desired to omit parts of any program, the high-speed key 41 is actuated whereby pulse switch 21 is energized through key switch 42. When the high-speed key 41 is actuated while none of the other selector keys 44, 48 or 52 is depressed, switch 43 will establish a circuit from the mains through switch 43 and switch 7 which is in its left-hand position to switch 42. It should be understood that the timer cannot be started up from its initial position shown in the drawing by means of key 41 but only from any intermediate position wherein switch 7 is in its left-hand position.

Of course more than three different speeds may be provided and low speeds will always be used where the same condition of the machine to be controlled persists for some time, for instance during the preliminary washing operation and during the heating-up cycle of the main washing operation. When the operation of the machine is to be changed at relatively short intervals, for instance during rinsing or swinging, the cam shaft will be advanced at a relatively high speed. It is a particular object of this invention that, in order to allow relatively slow advance of the cam shaft during the washing operations, secondary cyclic functions, such as the periodic reversal of the rotating direction of the washing drum, are controlled by a secondary cam shaft directly driven by the synchronous motor.

In the above description of the standard program it was assumed that the cam shaft 1 is driven at reduced speed during the heating-up period of the main washing operation by reversal of switch 16 to its contact 17. Of course it would be possible in substantially the same manner to so design the cam disc 15 actuating switch 16 that at the beginning of the main washing operation switch 16 is not completely reversed to contact 17 but is only separated from its contact 19 and is brought to an open neutral position between contacts 16 and 19. Under these circumstances, no pulses would be transmitted to the stepping solenoid 2. The normal washing operation would go on and the heater 14 would be energized until the thermostat put into circuit by the associated selector key switch would be changed over when the desired temperature is reached, while the cam shaft 1 is at rest. When the thermostat is changed over the cam shaft 1 would be advanced at high speed in the manner described by pulses arriving through the operative thermostat and switch 21, until cam 12 and switch 13 would break this circuit when the cam shaft reaches the position from which the said washing cycle of predetermined length and at a predetermined temperature starts.

What we claim is:

1. A program-timing device, comprising a cam shaft, a number of cam discs on said cam shaft for actuating individually associated control switches, parts of a machine to be controlled by the said control switches, a step gear operable by a step solenoid for stepwise rotation of the said cam shaft, a timing motor driving cam means, first, second and third pulse contacts operable by said cam means at a low, medium and high operating frequency respectively, hand-operable selector switches each individually associated with one predetermined type of program, selector switches operable by the said cam shaft and individually associated with the said hand-operable selector switches, selector circuits comprising hand-operable selector switches, selector switches operable by the cam shaft and the said pulse switches, the pulse switches being selectively and individually interconnected with the said step solenoid in accordance with the position of the said selector switches operable by hand or by the said cam shaft, for advancing the said cam shaft at a low, medium or high speed in accordance with the operating frequency of the said first, second or third pulse switch operably connected to the step solenoid.

2. A program-timing device, comprising a single program-controlling member actuating control switches, a single driving mechanism for advancing said program-controlling member at a normal speed, a standard program being controlled by said control switches when the program-controlling member is continuously driven at said normal speed, control means on said program-controlling member operable for driving said single driving mechanism and program-controlling member respectively at a high speed substantially exceeding said normal speed, means associated with said control means for deenergizing said control switches when said control means are operable for driving said program-controlling member at said high speed so that parts of said standard program are completely omitted, and means for driving said single driving mechanism and program-controlling member respectively at a speed substantially below said normal speed for extending parts of said standard program.

3. A program-timing device, comprising a single program-controlling member actuating control switches, parts of a machine controlled by the said control switches, a single driving mechanism for stepwise advancing the said program-controlling member at a low, medium and high speed respectively, hand operable selector switches of which each is associated with one of a number of predetermined programs, selector switches operable by the said program-controlling member and each individually associated with one of the said hand-operable selector switches, selector circuits comprising the said hand-operable selector switches, the said selector switches operable by the said program-controlling member and the said driving mechanism, pulse transmitting means adapted to produce pulses at a first, second and third sequence, the condition of said selector circuits depending on the position of the said hand-operable selector switches and the selector switches operable by the said program-controlling member, for transmitting said first, second or third pulse sequence to said driving mechanism and thereby actuating it at the said low, medium or high speed respectively.

4. A program-timing device, comprising a single program-controlling member actuating control switches, driving means for advancing the said program-controlling member at a normal speed and at a high speed substantially exceeding the said normal speed, hand-operable selector switches each individually associated with one of a number of predetermined programs, selector switches operable by the said program-controlling member and each individually associated with one of the said hand-operable selector switches, first selector circuits comprising the said hand-operable selector switches said selector switches operable by the said program-controlling member and the said driving means, temperature responsive switches each associated with one of said programs, and second control circuits each comprising contacts of a hand-operable selector switch and of the temperature responsive switch associated with one predetermined program, the said driving means and program-controlling member being actuated at the said normal or high speed responsive to a first and second condition of said first and second selector circuits, respectively, depending on the positions of the said hand-operable selector switches, the selector switches operable by the program-controlling member and of the temperature responsive switches.

5. A program-timing device comprising a single program-controlling member actuating control switches, driving means for advancing said program-controlling member at a normal speed, a standard program being controlled by said control switches when the program-controlling member is driven at said normal speed, means for driving said program-controlling member at a speed substantially exceeding said normal speed for shortening and omitting parts of said standard program, means for driving said program-controlling member at a speed substantially below said normal speed for extending parts of the said standard program, selector switches operable by the said program-controlling member and temperature responsive switches, and selector circuits comprising the said selector switches, the said temperature responsive switches and the said driving means, the speed of the driving means thereby depending on the position of the said selector switches and of the said temperature responsive switches.

6. A program-timing device according to claim 5, comprising at least one temperature responsive switch changing over from a first to a second position at a predetermined treating temperature in the machine to be controlled by the timing device, the said driving means being adapted to operate at reduced speed when the said temperature-responsive switch is in its said first position and at increased speed when the temperature-responsive switch is in its second position.

7. A program-timing device comprising a single program-controlling member actuating control switches, driving means for advancing said program-controlling member at a normal speed, a standard program being controlled by said control switches when the program-controlling member is driven at said normal speed, means for driving said program-controlling member at a speed substantially exceeding said normal speed for shortening and omitting parts of said standard program, means for driving said program-controlling member at a speed substantially below said normal speed for extending parts of the said standard program, a timing motor such as a synchronous motor continuously running at a constant speed, and a variable driving system being interposed between the timing motor and the said program-controlling member.

8. A program-timing device according to claim 7, comprising pulse switches operable by the said timing motor at different frequencies, a step solenoid for stepwise advancing the said program-controlling member, and means for selectively connecting one of the said pulse switches to the said step solenoid.

References Cited in the file of this patent

UNITED STATES PATENTS

| | | |
|---|---|---|
| 3,003,097 | Jennings | Oct. 3, 1961 |
| 3,011,079 | Mellinger | Nov. 28, 1961 |